US009964994B2

(12) United States Patent
Horgan et al.

(10) Patent No.: US 9,964,994 B2
(45) Date of Patent: May 8, 2018

(54) MOBILE DEVICE CONDUIT FOR A TRANSACTION DEVICE (71) Applicant: NCR Corporation, Duluth, GA (US)

(72) Inventors: Kevin Horgan, Broughty Ferry (GB); Gordon David Chisholm, Perth (GB)

(73) Assignee: NCR Corporation, Atlanta, GA (US)

( * ) Notice: Subject to any disclaimer, the term of this patent is extended or adjusted under 35 U.S.C. 154(b) by 369 days.

(21) Appl. No.: 14/068,757

(22) Filed: Oct. 31, 2013

(65) Prior Publication Data
US 2015/0120878 A1 Apr. 30, 2015

(51) Int. Cl.
G06F 15/16 (2006.01)
G06F 1/16 (2006.01)
G06Q 10/00 (2012.01)
G07F 19/00 (2006.01)
G07F 9/02 (2006.01)
H04W 12/06 (2009.01)

(52) U.S. Cl.
CPC ............ *G06F 1/165* (2013.01); *G06Q 10/20* (2013.01); *G07F 9/023* (2013.01); *G07F 9/026* (2013.01); *G07F 19/209* (2013.01); *H04W 12/06* (2013.01)

(58) Field of Classification Search
CPC ......... G06F 1/165; G06Q 10/20; G07F 9/023; G07F 9/026; G07F 19/209; H04W 12/06
See application file for complete search history.

(56) References Cited

U.S. PATENT DOCUMENTS

| 7,103,575 | B1* | 9/2006 | Linehan | G06Q 20/12 235/379 |
| 7,697,920 | B1* | 4/2010 | McClain | G06F 21/43 455/410 |
| 8,397,108 | B1* | 3/2013 | Vannatter | G06Q 10/00 714/23 |
| 9,135,422 | B2* | 9/2015 | Kuenzi | G06F 21/34 |
| 2002/0064283 | A1* | 5/2002 | Parenty | H04L 9/0825 380/277 |
| 2003/0191955 | A1* | 10/2003 | Wagner | G06F 21/572 713/191 |
| 2004/0097217 | A1* | 5/2004 | McClain | H04L 63/083 455/411 |
| 2006/0101311 | A1* | 5/2006 | Lipscomb | G07C 5/008 714/47.1 |
| 2007/0005201 | A1* | 1/2007 | Chenn | G07C 5/008 701/31.5 |
| 2007/0255115 | A1* | 11/2007 | Anglin, Jr. | G06F 19/3418 600/300 |
| 2008/0059606 | A1* | 3/2008 | Konopka | H04L 29/06 709/217 |
| 2008/0121692 | A1* | 5/2008 | MacPhail | G06Q 20/00 235/379 |
| 2009/0006632 | A1* | 1/2009 | Ramanathan | H04M 3/2218 709/228 |

(Continued)

Primary Examiner — Moustafa M Meky
Assistant Examiner — Andrea Hurst
(74) Attorney, Agent, or Firm — Schwegman, Lundberg & Woessner (57) ABSTRACT Methods and a system for a mobile device conduit of a transaction device are provided. A connection from a mobile device to a transaction device is made. Information is gathered from the transaction device and/or supplied to the transaction device from and/or to the mobile device. In an embodiment, the transaction device is used to remote a display of the mobile device to the transaction device.

17 Claims, 3 Drawing Sheets

(56) References Cited

U.S. PATENT DOCUMENTS

| | | | |
|---|---|---|---|
| 2009/0031403 A1* | 1/2009 | Huang | G06F 21/51 726/4 |
| 2009/0138866 A1* | 5/2009 | Veillette | G06F 8/67 717/168 |
| 2009/0204545 A1* | 8/2009 | Barsukov | G06Q 20/10 705/75 |
| 2009/0217025 A1* | 8/2009 | Paul | G06F 9/4416 713/2 |
| 2010/0125522 A1* | 5/2010 | Thomas | G06Q 20/20 705/44 |
| 2010/0161343 A1* | 6/2010 | Kennedy | G06Q 10/06 705/1.1 |
| 2010/0251360 A1* | 9/2010 | Sinclair | G06F 21/34 726/19 |
| 2011/0010761 A1* | 1/2011 | Doyle | G06F 21/6218 726/5 |
| 2011/0165896 A1* | 7/2011 | Stromberg | G06Q 20/32 455/466 |
| 2011/0166921 A1* | 7/2011 | Degraeve | G06Q 30/0222 705/14.23 |
| 2011/0231705 A1* | 9/2011 | McGraw, IV | G07F 19/20 714/27 |
| 2012/0015644 A1* | 1/2012 | Danford | H04L 41/0893 455/419 |
| 2012/0123884 A1* | 5/2012 | Bhasin | G07G 1/14 705/21 |
| 2012/0180123 A1* | 7/2012 | Kuenzi | G06F 21/34 726/20 |
| 2012/0253974 A1* | 10/2012 | Haikonen | G06Q 20/29 705/26.41 |
| 2012/0254345 A1* | 10/2012 | Montoya | G06F 11/2294 709/217 |
| 2013/0295902 A1* | 11/2013 | Justen | H04W 4/001 455/418 |
| 2015/0019427 A1* | 1/2015 | Murphy | G06Q 20/3224 705/44 |
| 2015/0046323 A1* | 2/2015 | Blythe | G06F 8/65 705/41 |

* cited by examiner

MOBILE DEVICE CONDUIT FOR A TRANSACTION DEVICE

BACKGROUND

Industry continues to innovate with respect to self-service devices. Increasingly, enterprises are reducing expenditures and deploying automated Self-Service Terminals (SST) where consumers can purchase their own goods and services without any attending personnel. The examples of such SSTs are endless including: Automated Teller Machines (ATMs), video rentals, electronic devices, gas pumps, soda/coffee/snack dispensers, grocery checkouts, lottery ticket dispensers, airline check-ins, hotel check-ins, rental car check-ins, gaming devices, and others.

Many of these SSTs may not be connected to any communication network (such as a snack vending machine) whereas others of these SSTs may be connected to a protected network (such as an ATM) without access to any other available communication network. In still other cases, some SSTs may be connected to a local private network with little to no capability to connect to outside resources. Yet, these SSTs still are electromechanical devices that can and do fail and that can and do require service from time to time from an engineer or a technician.

Service calls by engineers are inherently inefficient. Some enterprises may keep a log book that a visiting engineer can refer to, assuming that previous engineers had the foresight to record their previous visits (which is not always likely). Moreover, attempting to review service information on a small handheld device of a visiting engineer is often cumbersome and inefficient; as a result, newly trained engineers often find themselves on the phone with remote support more frequently than is likely necessary.

Furthermore, it is not just service that may require a physical visit by an engineer to a SST. For example, an enterprise may want to audit software licenses resident on the SST for compliance. This may be done due to government regulation, due to license renewals, and/or other standard auditing practices of an enterprise. Currently, license auditing is inefficient and fraught with errors as well.

SUMMARY

In various embodiments, a mobile device conduit for a transaction device is presented.

According to an embodiment, a method for using a mobile device as a conduit to acquire and/or communicate information to and from a transaction device is provided. Specifically, in an embodiment, a communication session is established between a device and a second device that is a transaction device, and the device is a mobile device. Next, information is acquired from a resource of the second device. Finally, the information is handled by the device.

DETAILED DESCRIPTION

Figure 1:
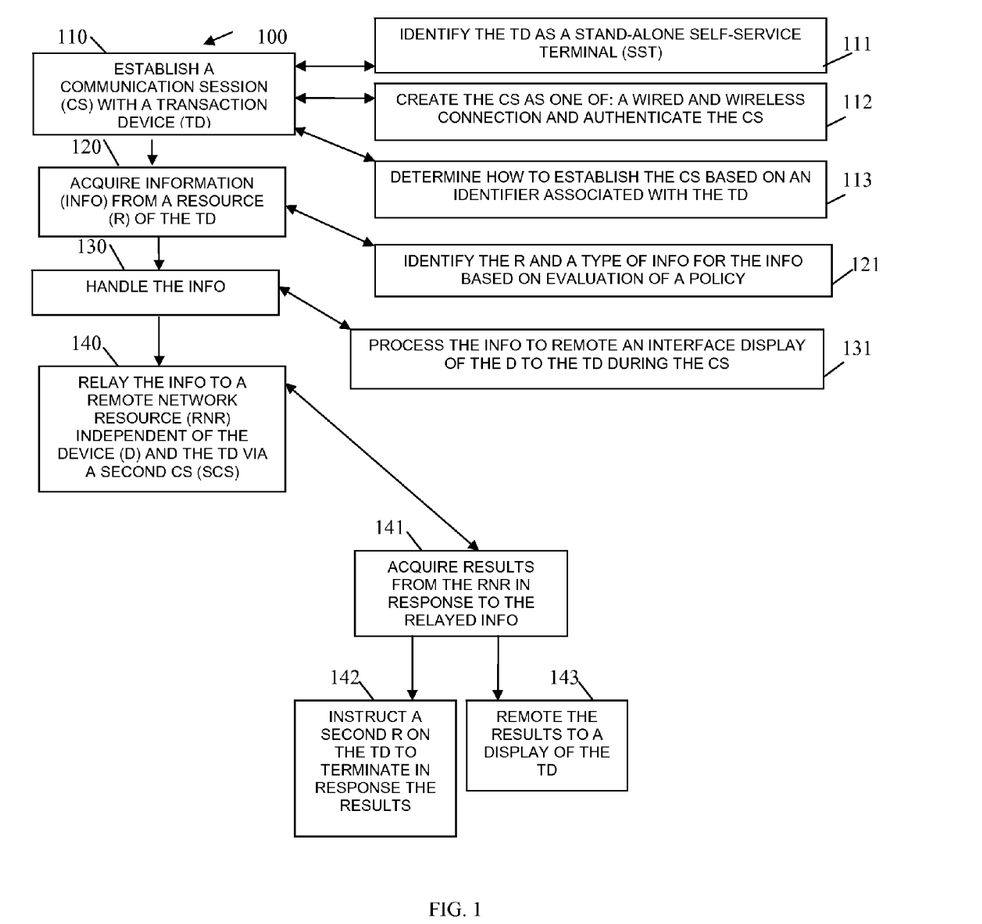
FIG. 1 is a diagram of a method for using a mobile device as a conduit to acquire and/or communicate information to and from a transaction device, according to an example embodiment.

FIG. 1 is a diagram of a method 100 for using a mobile device as a conduit to acquire and/or communicate information to and from a transaction device, according to an example embodiment. The method 100 (hereinafter "mobile device service") is implemented as instructions programmed and residing within memory and/or a non-transitory computer-readable (processor-readable) storage medium and executed by one or more processors of a mobile device. The processors are specifically configured and programmed to process the mobile device service. The mobile device service over a network. The network is wired, wireless, or a combination of wired and wireless.

In an embodiment, the mobile device is a smart phone, a tablet, a laptop, or a wearable processing device (glasses, watch, etc.).

According to one scenario, the mobile device is in the possession and being operated by a customer engineer (CE) or technician associated with an enterprise that services a transaction device in some manner.

In another case, the mobile device is in possession of and being operated by a customer or user of a transaction device.

Moreover, the transaction device can be any device that permits a consumer to make a self-service (such as a SST or Point-Of-Sale (POS) device) purchase without the assistance of physically present personnel. Thus, a video feed of an attendant is acceptable for any given transaction device. In one situation, the transaction device is an ATM.

Still further, the transaction device can be entirely disconnected from any network feed, can be connected to a dedicated and secure private network feed (such as when the transaction device is an ATM), can be connected to a local network feed, and the like. Generally, and in some embodiments, the transaction device lacks network capabilities with an insecure Wide-Area Network (WAN), such as the Internet (although it is noted that this does not always have to be the case).

In an embodiment, the mobile device service is a mobile application (mobile app) that is acquired or can be acquired from an application store and dynamically installed on the mobile device that processes the mobile device service. The mobile device can be registered along with its instance of a mobile device service with a backend enterprise system of a given enterprise. Authentication during communication between the backend enterprise system and the mobile device service can also be customized and can be multifactor (possession of and/or knowledge of multiple tokens and/or secrets used during authentication).

It is with this initial context that the processing of the mobile device service and various embodiments on that processing are discussed with reference to the FIG. 1.

At 110, the mobile device service establishes a communication session with a second device. The second device is a transaction device and the device that processes the mobile device service is a mobile device. Again, the mobile device can include such things as a smartphone, a tablet, a laptop, a wearable device with processing capabilities and the like.

In an embodiment, at 111, the mobile device service identifies the second device as a stand-alone Self-Service Terminal, such as an ATM.

The communication session can be established in a variety of manners. For example, at 112, the mobile device service can create the communication session via a wired and/or wireless connection and can authenticate the communication session. That is, the mobile device service can acquire details associated with the second device (transaction device) and send it to a third party service tied to managing the second device, such as the remote server service discussed in detail below with reference to the FIG. 3. These details permit the transaction device to be authenticated and permit the transaction to be identified.

According to an embodiment, at 113, the mobile device service determines how to establish a communication session based on an identifier associated with the second device (transaction device). This identifier can be communicated to a remote server service (discussed above at 112 and below with reference to the FIG. 3) to provide the procedure or automated mechanism for establishing a communication session. The identifier can also be resolved based on information already housed on the mobile device that processes the mobile device service (such as a reference guide downloaded and updated periodically to the mobile device or pushed to the mobile device). It may even be that a third-party service that has the mobile device or the mobile device service (mobile app instance) registered permits dynamic reference to provide a connection mechanism based on an identifier for the second device (transaction device).

The connection mechanisms themselves can vary as well. For example, in some instances Near Field Communication (NFC) taps can be used, Bluetooth can be used, Low Energy Bluetooth can be used, Radio Frequency can be used, WiFi can be used, Cellular can be used, a Universal Serial Bus connection can be used, voltage or power communications can be used, and others.

It may also be that once connected to the second device, the mobile device service acquires an identifier for the transaction device (second device) via the communication session. This can occur when the communication mechanism is already known by the mobile device service. But, some legacy transaction devices may have very limited networking capabilities and may lack software to effectively communicate an identifier to the mobile device service. In these latter instances, other techniques can be used to acquire an identifier for the transaction device, such as scanning an affixed barcode or Quick Response (QR) code that is visible on the transaction device somewhere; manually entering by the engineer into an interface associated with the mobile device service a serial number associated with the transaction device (also affixed somewhere on the transaction device), etc. In fact, in some instances the physical location (geographical position) of the mobile device may be communicated via the mobile device service to the remote server and based on that location the identifier for the transaction device is automatically resolved.

According to an embodiment, and once the mobile device service has identified the transaction device (second device) to the remote server (again discussed above at 112 and again below with reference to the FIG. 3), a variety of beneficial information can be dynamically acquired by the mobile device service processing on the mobile device and in possession of the customer engineer or technician that may be servicing the transaction device.

For example, consider the following scenario. An engineer is making a visit to an ATM (transaction device) using an instance of the mobile device service running on his/her mobile phone. Once the identifier for the ATM is known, the remote server (servicing enterprise system) pushes a call or incident history report for that ATM to the mobile phone. So, there is no concern that any manual notebook kept near the ATM is accurate, since the electronic incident report is automatically kept up-to-date. Moreover, there is no need for multiple calls from the engineer to customer service at the servicing enterprise because details of the history for the ATM are already pushed and available on the mobile phone of the engineer. Moreover, as will be discussed in greater detail below, the actual display screen of the ATM may be used as a remote display for the mobile device so as to permit easy viewing of that history report for the ATM by the engineer.

It is also to be noted that in some instances, the identifier for the transaction device is known in advance by the mobile device service even before the engineer visits the transaction device. This can occur when service call records are pushed to the mobile device service by the remote server (servicing enterprise for the transaction device); such that details on the identifier and other aspects of the transaction device are pushed in advance to the engineer via the mobile device service.

It is also to be noted that although various discussions and examples presented so far are related to an engineer or technician on a service call to the second device (transaction device), this situation does not always have to be the case as it may be that a user or customer of the transaction device approaches and establishes a connection to the transaction via a mobile device having an instance of the mobile device service for purposes unrelated to service, such as for purposes of remoting a display and/or interface of the user's mobile device on the transaction device (discussed at greater length herein and below).

At 120, the mobile device service acquires information from a resource of the second device (transaction device). The resource can be any physical or logical resource accessible via the communication session to the mobile device service, such as but not limited to: a peripheral device connected to the transaction device, a storage location, a register, a sensor, a file, a directory, and others. Moreover, the information can be electronic contents, data, settings, values, logs, reports, and the like available for of via the resource.

In an embodiment, at 121, the mobile device service identifies the resource and a type of information for the information to acquire based on evaluation of a policy. That is, policy available on the mobile device or accessible via the remote server can be used to determine what resource to query on the transaction device and what type of information to gather. So, where to look for information and what information to look for can be dynamically resolved by the mobile device service before connecting to the transaction device or after connection to the transaction device is made based on metrics gathered once connected.

In an embodiment, the information gathered is details associated with a license for the resource. So, the mobile device service can be used to connect to the transaction device to audit resource licenses. As stated before, it may also be the information is a service, problem, and/or transaction log retained by the transaction device. In some cases, the information is details about a display (its dimensions, pixel density, etc.) that is gathered.

For example, consider the following scenario. A smartphone of a technician (engineer) acquires (via an instance of the mobile device service) a log from the transaction device. The log can have a serial number or be assigned a serial number by the mobile device service so as to permit the log to be uniquely identified. The transaction device can again be an ATM.

Consider another scenario for the smartphone of the technician where an ATM (transaction device) is interrogated to find licensed functionality that the ATM is using. This can be sent to the remote server (discussed above and below with reference to the FIG. 3) and checked against a license sales database. A customer associated with the ATM can then be charged in an automated fashion or warned for using any unlicensed software. It may be (discussed below) that the unlicensed software can also be disabled via the mobile device service or via manual actions by the technician at the ATM. This scenario allows an enterprise to license, track, and audit specific software functionality that the enterprise licenses and if desired charge for such functionality. Such scenario allows an enterprise a mechanism to track valid resource licenses; so, functionality surreptitiously enabled by a customer via a setting can be discovered and fees requested or action taken based on such enablement. One technique is to have a software process populate a setting in registry of the ATM (or any transaction device), so when the mobile device service connects to the transaction device the setting can be acquired and checked against valid license information for the customer associated with that ATM. Discrepancies in what is expected in a setting versus what is properly licensed by the customer can trigger automated actions, such as but not limited to, disabling the functionality, removing the software associated with the functionality entirely, charging the customer, warning the customer, contacting the customer for explanation or to obtain a valid license, and the like.

At 130, the mobile device service handles the information. That is, the information is processed in some manner on the mobile device that has in instance of the mobile device service.

According to an embodiment, at 131, the mobile device service processes the information to remote an interface display of the mobile device to the second device (transaction device) during the communication session. So, here an engineer can remote a history log for the transaction device (such as ATM) to the display of the transaction device. In another instance, a customer can remote information on the customer's mobile device to a larger and more user friendly display associated with the transaction device. It may even be that the customer's interface is remoted to the transaction device essentially making the transaction device a thin client for the mobile device. Of course security can be enforced from the transaction device to prevent access to areas of the transaction device unauthorized to such a customer. In some instances, it may even be that the transaction device dynamically creates a virtual machine (VM) with thin client capabilities for the mobile device of the customer so as to protect assets that should not be available to the customer on the transaction device.

According to an embodiment, at 140, the mobile device service relays from the mobile device the information acquired to a remote network resource (such as the remote server for a servicing enterprise system); the remote network resource is independent of the mobile device and the transaction device and the relayed information occurs via a second communication session between the mobile device and the remote network resource. So, the mobile device service and the mobile device that processes the mobile device service becomes a conduit between the remote server (remote network resource-servicing enterprise system) and the second device (transaction device). The mobile device service provides network connectivity to the transaction device when that transaction device may have limited or no original network capabilities. Essentially, a transaction device can use the mobile device service of the mobile device to create a network connection not otherwise available to the transaction device.

Consider the ongoing examples presented above, where the smartphone of an engineer having an instance of the mobile device service connects to an ATM and then use the smartphone to transmit an ATM device log back to an enterprise system for analysis. Again, the log can include a unique serial number or identifier.

Continuing with the embodiment of 140 and in another embodiment at 141, the mobile device service acquires results from the remote network resource (remote server-enterprise system) in response to the relayed information. Here, the remote network resource can analyze or process the information in some manner to provide results.

Continuing with the example, the mobile device service can acquire files, such as log analysis or service histories, back from the remote network resource and in some instances the acquired files are digitally signed for authenticity and security.

Still continuing with the embodiment of 141 and in another embodiment at 142, the mobile device service instructs a second resource on the second device (transaction device) to terminate in response to the results. This scenario is useful when a software license is being violated on the transaction device or even when it appears that the second resource is infected in some manner and needs terminated or removed.

In another instance of 141 and another embodiment at 143, the mobile device service remotes from the mobile device the results to a display of the second device (transaction device). This scenario was discussed above and is useful to technicians and/or customers associated with the transaction device. In cases of ATM maintenance, this scenario is particularly useful since the engineer's smartphone is difficult to read whereas an ATM screen is much larger and can provide more information density than a small screen associated with a smartphone.

It can now be understood how a mobile device (via an instance of the mobile device service) can be used as a conduit between a transaction device (SST and others) and a remote server or network (servicing enterprise). This is particularly useful for maintenance of transaction devices, such as an ATM. It is often the case, that an engineer servicing an ATM is taking an action to try and clear a recurring fault where the only indication of a previous issues are recorded in a handwritten booklet storage locally at the ATM, which is obviously error prone and in many cases deficient (lacking service call details). The ability to have history pushed from a remote source (remote server-servicing enterprise system) but then displayed locally on a reasonably sized ATM screen encourages engineers to pay attention and read service histories to take the appropriate course of action in a much more reasonable time frame. This provides the customer engineer with better quality information at the ATM and aids first time resolution of issues while preventing actions from being repeatedly taken unnecessarily on repeat visits to the ATM for subsequent service calls. This leads to incident reductions through decreased repeat calls and increased customer satisfaction with the ATM or any transaction device for that matter.

In addition, the mobile device service permits enterprises that license software or specific functionality of software to self-audit their transaction devices. Moreover, the engineers need not even be aware that this audit is occurring since the mobile device service can do it automatically and transparently when connected to the transaction device and/or the remote server and automated actions taken based on the license audit (as discussed above).

Still further, the mobile device service can permit customers (with security enforced) to remote their mobile device screens to the transaction display and in some instances even use the transaction display and its buttons as a thin client interface for the customers' smartphones. This may be particularly useful to elderly or sight impaired individuals.

Figure 2:
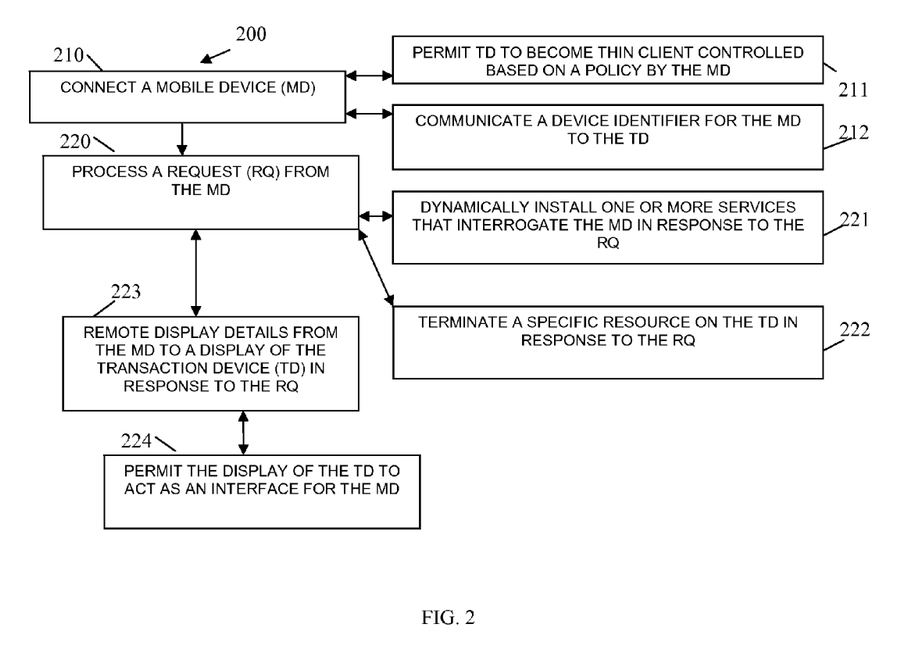
FIG. 2 is a diagram of another method for operating a mobile device as a communication conduit for a transaction device, according to an example embodiment.

FIG. 2 is a diagram of another method 200 for operating a mobile device as a communication conduit for a transaction device, according to an example embodiment. The method 200 (hereinafter "transaction service") is implemented as instruction and programmed within memory and/or a non-transitory computer-readable (processor-readable) storage medium that executes on one or more processors of a transaction device; the processors of the transaction device are specifically configured to execute the transaction service. The transaction service is operational over a network; the network is wired, wireless, or a combination of wired and wireless. However, in many situations the network of the transaction service is circumscribed and may not be capable of communicating with an insecure WAN, such as the Internet. Moreover, in some situations the network of the transaction service lacks wireless capabilities and requires a wired connection between the mobile device (discussed above with reference to the FIG. 1) and the SST.

Whereas the mobile device service (the FIG. 1 above) describes processing (for the most part) associated with a CE's mobile device (or in some instances a customer's/user's mobile device), the transaction service describes processing from a transaction device (ATM, self-service grocery checkout, video rental device, beverage or snack dispenser, gaming device, etc.). The transaction service interacts with the mobile device service, described in detail above with respect to the FIG. 1.

At 210, the transaction service connects to a second device. The transaction service processes as an agent on a transaction device and the second device is a mobile device associated with a technician for the transaction device or a customer of the transaction device.

According to an embodiment, at 211, the transaction service permits the device processing the transaction service (transaction device—SST, etc.) to become a thin client controlled based on a policy by the second device (mobile device). Again, the policy can be used to enforce security and other agents on the transaction device can also independently enforce security to ensure secure assets of the transaction device are not compromised in instances where the second device (mobile device) lacks proper security for such assets. In some cases, a dynamically created or existing VM instantiated on the transaction device can be activated to provide the thin client functionality to the second device (mobile device).

In another case, at 212, the transaction service communicates a device identifier for the transaction device to the second device (mobile device). The use of this identifier can be used for a variety of purposes, some of which were discussed at length above with reference to the FIG. 1. The identifier can also be used to acquire the policy evaluated and the security enforced as discussed above at 211.

At 220, the transaction service processes a request from the second device (mobile device). A variety of processing can occur.

For example, at 221, the transaction service can dynamically install one or more service that interrogates the transaction device in response to the request. Here, auditing software can be installed and other software that can be used to assist in processing the request. The one or more services can be removed when the connection to the mobile device ends or can remain for subsequent connections and again this can be based on policy and/or security considerations with the transaction device.

In an embodiment, at 222, the transaction service terminates a specific resource on the device (transaction device) in response to the request. This can be related to an unauthorized license for the resource or a resource that is problematic in some manner on the transaction device (as discussed above with reference to the FIG. 1).

In an embodiment, at 223, the transaction service remotes display details from the second device (mobile device) to a display of the transaction device in response to the request. This remoting feature was discussed at length above with reference to the FIG. 1 and is particularly useful to servicing engineers interested in reviewing service histories and details for the transaction device.

Continuing with 223 and in another embodiment at 224, the transaction service permits the display of the transaction device to act as an interface for the second device (mobile device). So, hard keys or buttons can be tied to the interface of the mobile device being remoted or soft keys can be rendered on the transaction display for the interface. It may also be that the interface is a touchscreen interface that is supported on the transaction device. It is noted that the transaction device remains a thin client such that processing activated by the remoted interface on the transaction device is actually processed on the mobile device.

The transaction service demonstrates how an agent installed on a transaction device can be processed to provide functionality in an automated fashion that compliments the discussion presented above with respect to the mobile device service of the FIG. 1.

Figure 3:
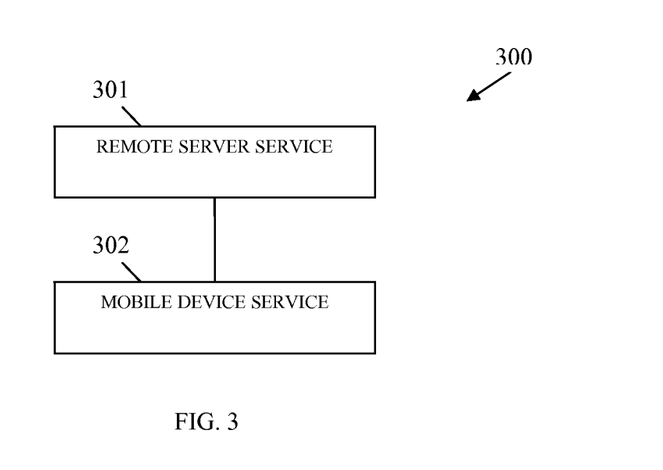
FIG. 3 is a diagram of a transaction communication conduit system, according to an example embodiment.

FIG. 3 is a diagram of a transaction communication conduit system 300, according to an example embodiment. The components of the transaction communication conduit system 300 are programmed and resided within memory and/or a non-transitory computer-readable medium and execute on one or more processors of one or more devices. Transaction communication conduit system 300 is operational over a network and the network can be wired, wireless, or a combination of wired and wireless.

The transaction communication conduit system 300 includes a remote server service 301. In an embodiment, the transaction communication conduit system 300 also includes a mobile device service 302. Each of these will be discussed in turn.

The transaction communication conduit system 300 includes a server or cloud processing environment having the remote server service 301 programmed within memory and/or a non-transitory computer-readable storage media as executable instructions. The server or cloud processing environment executes the remote server service 301. Example aspects associated with the remote server service 301 were presented above with reference to the FIGS. 1 and 2 (discussed as the remote server, remote network resource, or servicing enterprise system/service).

The remote server service 301 is configured to interact with a transaction device via a network connection supplied by a mobile device acting as a conduit between the remote server service 301 and the transaction device. Processing associated with the mobile device was discussed above with reference to the FIG. 1 and the mobile device service. Moreover, processing associated with the transaction device was discussed above with reference to the FIG. 2 and the transaction service.

The remote server service 301 provides a variety of backend processing and analysis that is typically available via a support system for an enterprise; however, the remote server service 301 uses a mobile device to communicate in an automated manner a transaction device, such as legacy transaction devices that lack networking capabilities or lack direct communication capabilities with the remote server service 301.

In an embodiment, the transaction communication conduit system 300 also includes a mobile device having the mobile device service 302 programmed within memory and/or a non-transitory computer-readable storage media as executable instructions. The mobile device (phone, laptop, tablet, wearable device, etc.) executes the mobile device service 302. Example processing associated with the mobile device service 302 was presented above in detail with reference to the FIG. 1.

The mobile device service 302 is configured to connect with the transaction device and with the remote server service 301 to act as an intermediary or conduit between the transaction device and the remote server service 301.

According to an embodiment, the mobile device is one of: a smartphone, a laptop, a tablet, and a wearable device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
   establishing, via a mobile device, a communication session with a transaction device, wherein establishing further includes operating the mobile device by a technician that is interacting with the transaction device through the mobile device during the communication session, wherein establishing further includes scanning, by the mobile device, a Quick Response (QR) code having an identifier for the transaction device, and automatically providing, by the mobile device, the identifier to a remote server service, and receiving, by the mobile device, from the remote server service an automated mechanism, and automatically processing, by the mobile device, the automated mechanism for establishing the communication session between the mobile device and the transaction device; and
   acquiring, via the mobile device, service information associated with a physical resource connected to the transaction device, and providing through the mobile device a wide area network connectivity to the transaction device that was previously unavailable to the transaction device.

2. The method of claim 1 further comprising, processing, from the mobile device the information to remote an interface display of the mobile device to the transaction device during the communication session.

3. The method of claim 1 further comprising, relaying, from the mobile device, the information to a remote network resource independent of the mobile device and the transaction device via a second communication session.

4. The method of claim 3 further comprising, acquiring, at the mobile device, results from the remote network resource in response to the relayed information.

5. The method of claim 4 further comprising, instructing, from the mobile device, a second resource on the transaction device to terminate in response to the results.

6. The method of claim 4 further comprising, remoting, from the mobile device, the results to a display of the transaction device.

7. The method of claim 1, wherein establishing further includes identifying the transaction device as a stand-alone Self-Service Terminal (SST).

8. The method of claim 1, wherein establishing further includes creating the communication session via one of: a wired and a wireless connection between the mobile device and the transaction device and authenticating the communication session.

9. The method of claim 1, wherein acquiring further includes identifying the resource and a type of information for the information based on evaluation of a policy.

10. A method, comprising:
    connecting, at a transaction device, to a mobile device, wherein connecting further includes operating the mobile device by a technician that is interacting with the transaction device through the mobile device over a connection between the transaction device and the mobile device, wherein connecting further includes scanning, by the mobile device, a Quick Response (QR) code having a transaction identifier for the transaction device, and automatically providing, by the mobile device, the transaction identifier to a remote server service and receiving, by the mobile device, an automated mechanism, and automatically processing, by the mobile device, the automated mechanism that establishes the connection between the mobile device and the transaction device; and
    processing, by the transaction device, a request from the mobile device permitting the mobile device through the request to service at least one physical resource connected to the transaction device and obtaining by the transaction device a wide area network connection through the mobile device when the wide area network connection was unavailable to the transaction device but for the mobile device.

11. The method of claim 10, wherein connecting further includes permitting the transaction device to become a thin client controlled based on a policy by the mobile device.

12. The method of claim 10, wherein processing further includes dynamically installing one or more services that interrogate the transaction device in response to the request.

13. The method of claim 10, wherein processing further includes terminating a specific resource on the transaction device in response to the request.

14. The method of claim 10, wherein processing further includes remoting display details from the mobile device to a display of the transaction device in response to the request.

15. The method of claim 14, wherein remoting further includes permitting the display of the transaction device to act as an interface for the mobile device.

16. A system, comprising:
- a server having a remote server service programmed as executable instructions within a non-transitory computer-readable memory and the executable instructions of the remote server service executed from the non-transitory computer-readable memory by one or more processors of the server;
- wherein the remote server service when executed interacts with a transaction device via a network connection supplied by a mobile device acting as a conduit between the remote server service and the transaction device, and wherein the transaction device lacks wide-area network connectivity but for the conduit provided by the mobile device using the network connection, and wherein the remote server service receives from the mobile device a transaction identifier for the transaction device, wherein the mobile device scans a Quick Response (QR) code for obtaining the transaction identifier, and the mobile device automatically provides the transaction identifier to the remote server service, the remote server service provides back to the mobile device an automated mechanism and the mobile device automatically processes the automated mechanism to establish a connection between the mobile device and the transaction device.

17. The system of claim 16, wherein the mobile device is one of: a smartphone, a laptop, a tablet, and a wearable device.

* * * * *